United States Patent Office 2,778,597
Patented Jan. 22, 1957

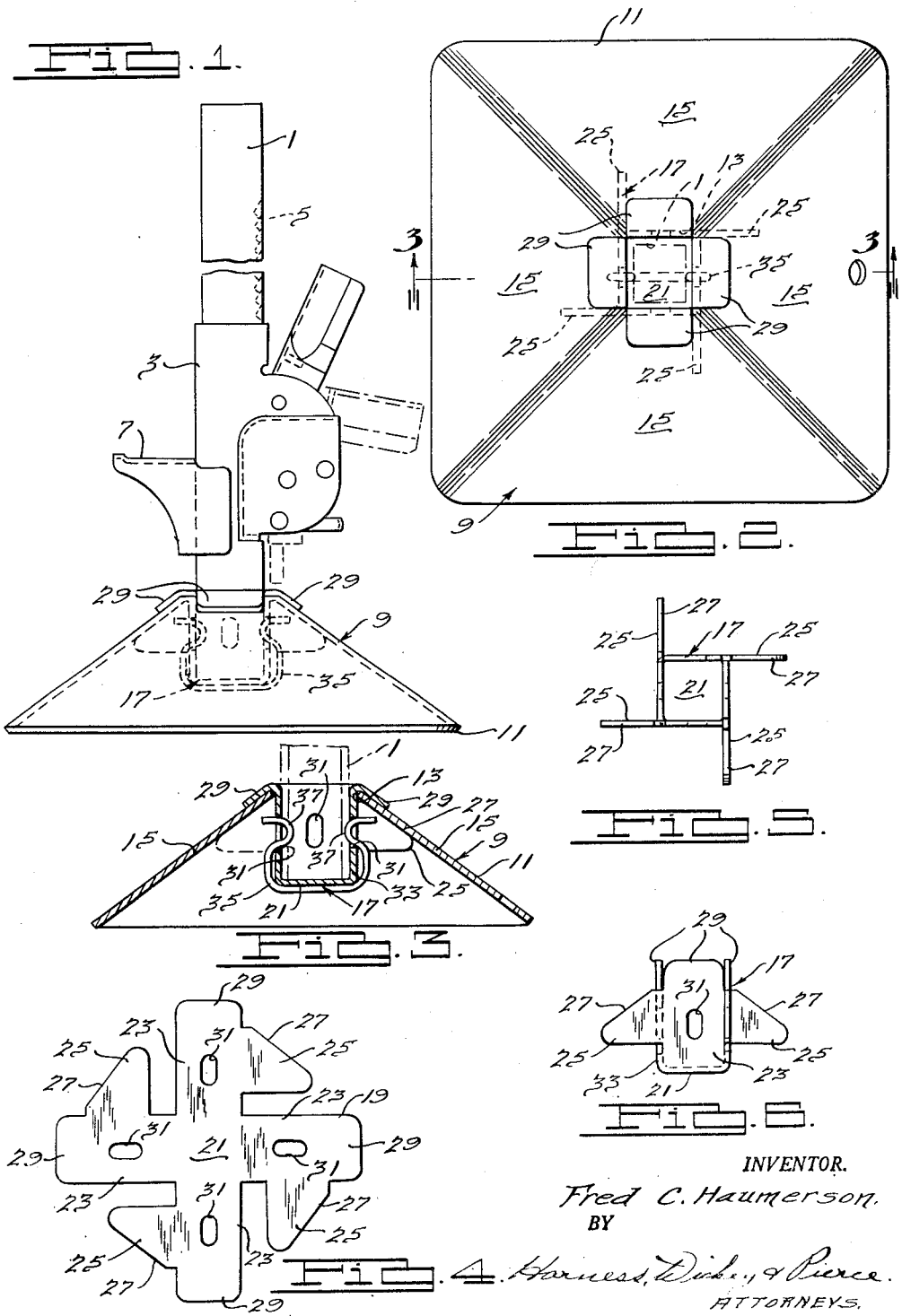

2,778,597
BASE STRUCTURE

Fred C. Haumerson, Racine, Wis., assignor to Walker Manufacturing Company of Wisconsin, Racine, Wis., a corporation of Wisconsin Application January 20, 1951, Serial No. 207,031

6 Claims. (Cl. 248—346)

This invention relates to thrust bar supporting structures and, in particular, refers to a base structure that may be used to support the lower end of the vertical post or rack bar in an automobile jack.

It is the principal object of this invention to decrease the cost and facilitate the manufacture of base structures such as used for automobile jacks and, at the same time, improve their load carrying characteristics.

The invention provides a two-piece base structure consisting of an arched member or plate having an opening at the apex of the arch and a socket clamped to the portions of the plate surrounding the opening and in alignment with the opening so that it may receive the end of the thrust or rack bar. The design is such that both the plate and the socket may be fabricated by stamping, pressing, and allied operations from flat sheet stock. The socket is of a novel construction whereby portions thereof engage opposite surfaces of the plate around the opening so that a tight grip of the socket on the plate is obtained. This engagement between the socket and plate is sufficient to maintain them in assembled relation and to transmit load from the socket to the plate. Thus, no welding or riveting or similar methods of attachment need be employed. The invention also contemplates the use of a spring wire clip of round cross section for yieldably holding the post or bar in the socket.

An illustrative and preferred embodiment of the invention, which, however, is not intended to limit the application of the invention, is shown in the accompanying drawings wherein:

Figure 1 is a side elevation of a bumper jack for automobiles having a base structure embodying the present invention;

Fig. 2 is a plan view of the base structure shown in Fig. 1 with the post and lifting structure removed;

Fig. 3 is a cross section through the base structure shown in Fig. 2 taken along the line 3—3;

Fig. 4 is a plan view of a flat blank that is used to form the socket employed in the base structure of this invention;

Fig. 5 is a plan view of the socket as it appears in a condition that is ready for assembly with the arched plate; and Fig. 6 is a side elevation of the socket shown in Fig. 5.

The automobile bumper jack shown in Fig. 1 includes a vertical post or thrust bar 1 that has a lifting head 3 of any desired construction which moves up and down the post 1 in the teeth 5 that are formed on one side of the post. The lifting head 3 has a laterally extending lip 7 which engages the underside of an automobile bumper to receive the weight of the automobile. This load on the lip 9 is transmitted by the lifting head 3 to the vertical post 1 and results in a vertical thrust load in the post that is transmitted downwardly to the base structure 9 at the bottom of the jack.

As more clearly seen in Figs. 2 and 3, the base structure 9 includes a convex or arched outer plate or shell 11 having an opening 13 at its apex. While the shell or plate 11 may be of various shapes and formed in various ways, it is preferably a truncated, four-sided pyramid stamped from flat stock. It therefore has four flat sides 15 which taper from a maximum width at the bottom of the plate to a minimum width at their top edges, the top edges defining together the edge of the opening 13. This opening is of the same shape as the cross section of the post 1 and, in the present embodiment, is therefore square.

The base structure 9 includes also a socket 17 which is secured to the plate 11 in alignment with the opening 13 so as to receive load from the bottom of the post 1. It is shaped so that it is of the same cross section as the post whereby it serves also to maintain the post in a steady erect position. The socket 17 is formed from a flat blank 19 shown in Fig. 4. The blank 19 has a center section 21 which is of approximately the same shape and size as the cross section of the bottom of the post 1, being square in the present case. Arms 23 extend outwardly from the center section 21, four arms being formed on the blank 19 to correspond to the four sides of the hole 13 and the post 1. Each of the arms 23 has a transverse wing 25 formed on one side, the wings 25 being shown on the clockwise side of the arms 23. The outermost edge 27 of each wing 25 is slanted on an angle to the axis of its arm 23 which is substantially the same as the slant of each side 15 of the plate 11. The wings 25 are located inwardly of the outermost end of each of the arms and the arm portions included between the wings and the outermost ends constitute ear or tab sections 29. Holes 31 for the spring clip may be pierced in each of the arms 23, if desired.

The blank 19 is formed into the socket 17 by folding the arms 23 at right angles to the central section 21 along the edges of the central section. This is preferably done in a drawing and forming operation so that the center section 21 is drawn into a cup having a substantial depth, 25 percent of the width of the center section being found satisfactory though the invention is not limited to this figure. The edge of the cup formed by drawing the center section 21 is indicated by the reference numeral 33 in the drawings. After the drawing and forming operation has been completed, the socket 17 has been created from the blank 19 and appears in the form shown in Figs. 5 and 6, ready for assembly with the plate 11. At this stage, the ear sections 29 are coplanar with the arms 23 and can therefore be inserted through the opening 13 from underneath the arched plate 11. The socket 17 is inserted through the opening 13 until the edges 27 of the wings 25 engage the under surfaces of the sides 15. The ear sections 29 are then folded around the edges of the opening 13 and on to the top surfaces of the sides 15. It will be clearly seen from Fig. 3 that, after this has been done, the socket 17 is tightly clamped to the sides 15, the sides 15 being held between the ears 29 and the edges 27 of the wings 25. It will be seen that the wings 25 are more than mere shoulders and have a sufficiently long engagement with the arch to prevent tipping of the socket, i. e., the wings act to hold the socket in axial alignment with the aperture 13.

The bottom of the post seats in the socket 17 on the bottom 21 which is the center section of the original blank 19. The arms 23 fit closely to the sides of the post and prevent its transverse shifting. The post is yieldably held in the socket 17 by means of one or two spring clips 35 formed from round spring wire. The spring clip 35 has a general U-shape with the base extending beneath the socket 17 and the legs extending upwardly along the sides or arms 23 of the socket. Transverse U-shaped sections 37 are formed in the legs of the clip and these extend through the apertures 31 and into suitable recesses formed in the lower end of the post and therefore yieldably connect the lower end of the post 1 to the socket 17 in an obvious manner. The fact that the spring clip 35 can be made of round wire rather than flat spring strip, as heretofore, enables a reduction in the cost of manufacture which, though small, is important in the mass production of these units for use in automobiles.

It will now be recognized that the invention provides a thrust bar supporting structure which may be readily and inexpensively manufactured on a large scale. Also, certain modifications of the precise structure shown herein only by way of illustration will be apparent to those in the art. For example, the shape of the plate 11 may be of various forms as may the hole 13 and these changes will be reflected in the shape of the blank 19 and thus the component portions of the socket 17. It is within the broad purview of this invention to form separate slots in plate 11 for the ears and to pass the ears 29 through them prior to folding rather than through the opening 13. Also, though it is very desirable to draw the center section 21 in order to increase the strength of the socket 17, certain advantages of the invention will be obtained without this operation.

What is claimed is:

1. A base structure for supporting the end of a thrust bar comprising, in combination, a multi-sided arched member having an opening at its apex, a socket in alignment with said opening and adapted to receive the end of a thrust bar, said socket comprising a bottom section to receive the end of the thrust bar, said socket having arms extending upwardly from said bottom section and folded at an angle of substantially 90 degrees thereto and parallel to the axis of the opening, said arms having wings located intermediate the bottom section and the top ends of the arms and extending transversely thereof for a substantial distance, the top edges of said wings being inclined to the axis of said opening and engaging the sides of said arch on the under side of the arch, said arms extending upwardly through said arched member and the top ends thereof being bent over against the tops of the arch sides so that said socket is clamped to said arch by said wings and arms.

2. In a base structure for supporting the end of a thrust bar, an arched member having an apex at its top and at its bottom having a peripheral edge adapted to rest on a supporting surface, said apex having an opening therein with its axis substantially normal to a plane defined by said peripheral edge, a rigid and non-collapsible socket in alignment with said opening and adapted to receive the end of a thrust bar, said socket having a bottom section to receive the end of the thrust bar, said bottom section being located a substantial distance above a plane defined by said peripheral edge, said socket having tab means thereon extending through the arched member and bent over upon the top side of the arched member, said socket having more than two wings extending for a substantial distance radially with respect to the axis of said opening and substantially equiangularly spaced from each other about said axis, the top edges of said wings being inclined to said axis and engaging said arched member on the underside thereof adjacent to said apex opening.

3. A three-piece base structure for supporting the end of a thrust bar consisting of an arched hollow metal stamping of a generally pyramidal shape, the base of said stamping being open and adapted to rest on a supporting surface, the apex of said stamping having an opening therein the axis of which is parallel to an altitude of the pyramid and normal to a plane defined by said base, a socket for the end of a thrust bar having a bottom section to receive said bar, said socket having sidewalls extending parallel to said axis and portions thereof extending through said stamping and being bent over the top of the stamping and engaging the top surface thereof, said socket having a multiplicity of wings radiating from said sidewalls in all directions with respect to said axis, said wings engaging the underside of said stamping whereby said socket is clamped thereto by said wings and said sidewall portions, said socket having a pair of apertures located in opposite sidewalls thereof and spaced above said bottom section, and a U-shaped spring wire extending around the bottom of said socket and having portions thereof projecting through said apertures into the inside of the socket and adapted to provide resilient means for gripping the end of a thrust bar disposed inside the socket.

4. In a base structure for supporting the end of a thrust bar, an arched member having an opening therethrough at the top thereof, a socket secured to the arch member in alignment with said opening and having a bottom section to receive the end of a thrust bar, said socket being formed from a flat metal stamping which is cross shaped with four arms extending at right angles to each other from a common area of intersection which area comprises said bottom section, said arms being folded at right angles to said common area and section to form sidewalls of said socket, said arms each having a wing of substantial length extending transversely thereof and located intermediate said common area and section and the free end of the arm, said wings engaging the underside of said member and said free ends of said arms being bent over on the top of said arched member.

5. The invention set forth in claim 4 wherein said common area is deformed from the plane of said stamping so that said bottom section comprises a bottom surface that is substantially perpendicular to the axis of said opening and a peripheral flange portion around the circumference of said bottom surface and at substantially a right angle thereto.

6. The invention set forth in claim 4 wherein said arched member is a metal stamping in the form of a trucated pyramid with four flat sides and said socket has a wing engaging each of said sides at a point spaced a substantial distance transversely from said sidewalls and acting to prevent tipping of the socket in the member.

References Cited in the file of this patent

UNITED STATES PATENTS

| | | |
|---|---|---|
| 170,920 | Tuck | Dec. 7, 1875 |
| 572,735 | Thompson | Dec. 8, 1896 |
| 1,455,525 | Finley | May 15, 1923 |
| 1,559,563 | Edmister | Nov. 3, 1925 |
| 2,225,592 | McFadden | Dec. 17, 1940 |
| 2,400,235 | Johnson | May 14, 1946 |
| 2,454,119 | Atkinson | Nov. 16, 1948 |

FOREIGN PATENTS

| | | |
|---|---|---|
| 916,918 | France | Dec. 19, 1946 |